US010717610B1

(12) United States Patent
Daboub

(10) Patent No.: US 10,717,610 B1
(45) Date of Patent: Jul. 21, 2020

(54) MECHANICALLY LOCKING DIVERTER

(71) Applicant: National Presort, Inc., Fort Worth, TX (US)

(72) Inventor: Brent Daboub, Fort Worth, TX (US)

(*) Notice: Subject to any disclaimer, the term of this patent is extended or adjusted under 35 U.S.C. 154(b) by 0 days.

(21) Appl. No.: 16/268,976

(22) Filed: Feb. 6, 2019

(51) Int. Cl.
*B65G 47/84* (2006.01)

(52) U.S. Cl.
CPC ........ *B65G 47/844* (2013.01); *B65G 2201/02* (2013.01)

(58) Field of Classification Search
CPC .................................................... B65G 47/844
USPC .................. 198/370.02, 370.07, 890, 890.1
See application file for complete search history.

(56) References Cited

U.S. PATENT DOCUMENTS

| | | | | |
|---|---|---|---|---|
| 4,738,347 A * | 4/1988 | Brouwer | ............... | B65G 47/844 198/370.02 |
| 5,613,591 A * | 3/1997 | Heit | ...................... | B65G 47/844 198/370.02 |
| 5,732,814 A * | 3/1998 | Owczarzak | .......... | B65G 47/844 198/370.02 |
| 6,478,144 B1 * | 11/2002 | Sweazy | ................... | B07C 3/065 198/370.02 |
| 6,705,452 B2 * | 3/2004 | Greve | .................. | B65G 17/005 198/370.02 |
| 7,431,140 B2 * | 10/2008 | Tarlton | ................. | B65G 17/005 198/370.02 |
| 7,690,496 B1 * | 4/2010 | Fye | ...................... | B65G 17/005 198/370.02 |
| 7,798,306 B2 * | 9/2010 | Brayman | ............. | B65G 47/844 198/370.02 |
| 7,921,984 B2 * | 4/2011 | Ripkens | ............... | B65G 17/005 198/370.03 |
| 8,069,969 B2 * | 12/2011 | Vlug | .................... | B65G 47/844 198/370.02 |
| 8,069,972 B2 * | 12/2011 | Raybon | .................. | B65G 47/22 198/456 |
| 8,561,781 B2 * | 10/2013 | Terrell | ................. | B65G 47/766 198/370.07 |
| 8,727,096 B2 * | 5/2014 | Schroader | ............ | B65G 47/844 198/370.01 |
| 9,290,331 B2 * | 3/2016 | Fye | ........................ | B65G 47/52 |
| 9,302,855 B2 * | 4/2016 | Guernsey | ............. | B65G 47/844 |
| 9,457,961 B2 * | 10/2016 | Green, III | ............ | B65G 47/844 |
| 9,469,177 B2 * | 10/2016 | Haefner | ................ | F28F 9/0256 |
| 10,196,213 B2 * | 2/2019 | Axmann | .............. | B65G 47/844 |
| 10,486,917 B1 * | 11/2019 | Vulpetti | ............... | B65G 47/844 |

* cited by examiner

*Primary Examiner* — Douglas A Hess
(74) *Attorney, Agent, or Firm* — James E. Walton

(57) ABSTRACT

A mechanically locking diverter utilizes a rotational actuator to translate a pin, thereby moving a diverter flipper between a divert position and a non-divert position. The diverter flipper moves a roller attached to a pin attached to a shoe that translates along a slat.

15 Claims, 9 Drawing Sheets

MECHANICALLY LOCKING DIVERTER

BACKGROUND

1. Technical Field

This invention relates to a sortation conveyor system, in particular, diverters used in such sortation conveyor systems for diverting shoes, such as letters, flats, parcels, and polybags, along conveyor systems sorter in automatic sorting machines.

2. Description of Related Art

Machines for automatically sorting articles, such as mail, into one of an array of selected bins or compartments, are common. Typically, such sorting machines have a feeding mechanism that inducts articles one-at-a-time into belts and/or onto conveyors. Sensing components along the travel path monitor and track the movement of the articles. When necessary, control electronics command a diverting gate assembly or other redirecting mechanisms to reroute the article into a specific destination compartment or bin.

Conventional diverter gates move by either a solenoid or linear actuator. Unfortunately, the actuation of the conventional diverter gate causes the diverter to bounce during actuation. Having a loose diverter gate or an unexpected gate move at an unexpected time while the transport belt is moving could cause potential damage to such mechanism and or the system as a whole. Accordingly, there exists a need for a mechanically locking diverter that cannot move or bounce inadvertently.

BRIEF DESCRIPTION OF THE DRAWINGS

The novel features believed a characteristic of the system of the present application is set forth in the present application. However, the system itself, as well as a preferred mode of use, and further objectives and advantages thereof, will best be understood by reference to the following detailed description when read in conjunction with the accompanying drawings, wherein.

Figure 1:
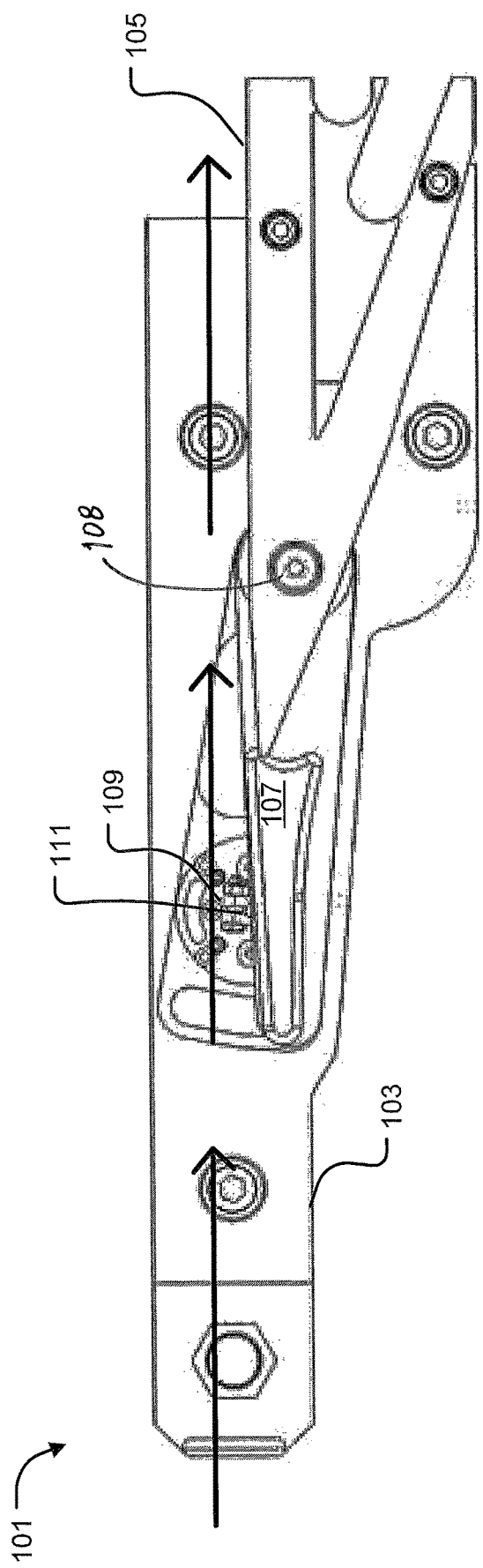
FIG. 1 is a general view of the preferred embodiment of a mechanically locking diverter that is located in the not diverted position according to the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, combinations, and alternatives falling within the spirit and scope of the present application.

DETAILED DESCRIPTION OF THE PREFERRED EMBODIMENT

Illustrative embodiments of the system of the mechanically locking diverter of the present application are described below. In the interest of clarity, not all features of an actual implementation are described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
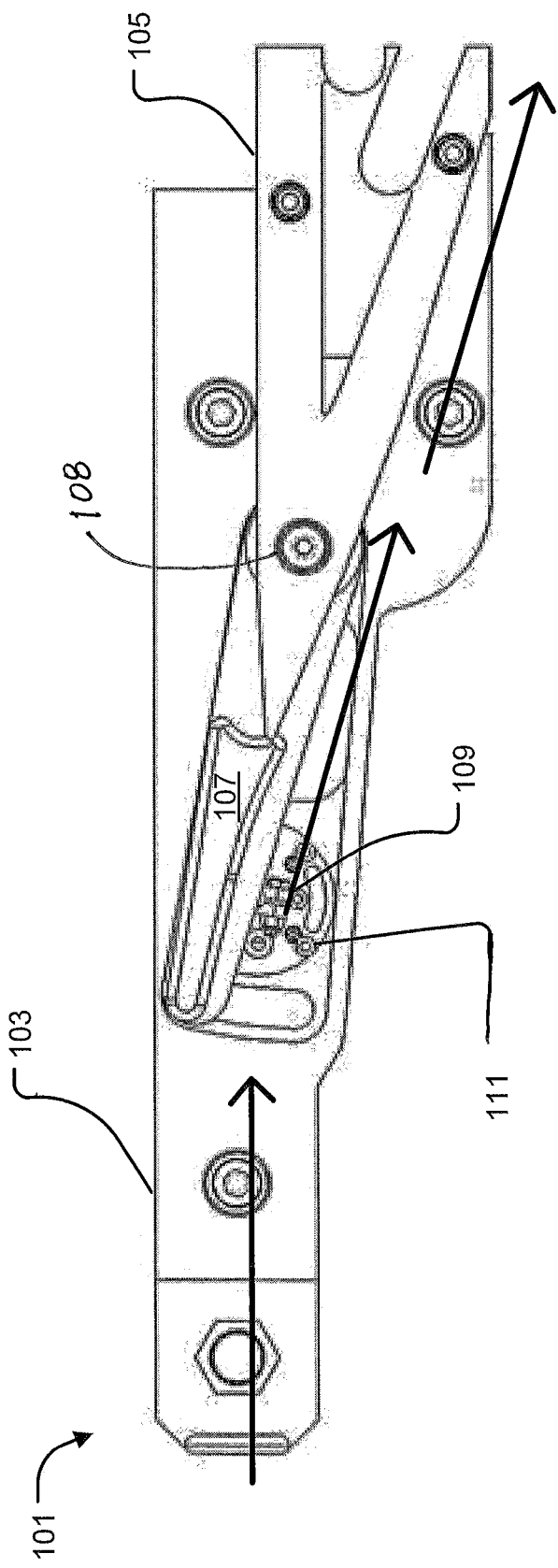
FIG. 2 is a general view of the preferred embodiment of a mechanically locking diverter that is located in the diverted position according to the present application.

Referring now to FIGS. 1 and 2 in the drawings, the preferred embodiment of a mechanically locking diverter 101 according to the present application is illustrated. Diverter 101 is comprised of a diverter block 103, a diverter pin guide 105, a diverter flipper 107, an actuator arm 109, and an actuator 111. Diverter flipper 107 pivots about a pivot pin 108, such that diverter 101 is operable between a non-divert position in which diverter flipper 107 is in line with diverter pin guide 105, as shown in FIG. 1; and a divert position, in which diverter flipper 107 is angled relative to diverter pin guide 105, as shown in FIG. 2. Depending upon the position of diverter flipper 107, a shoe 805 (see FIG. 11) will progress in the direction of the bold arrows shown in FIGS. 1 and 2.

Figure 3:
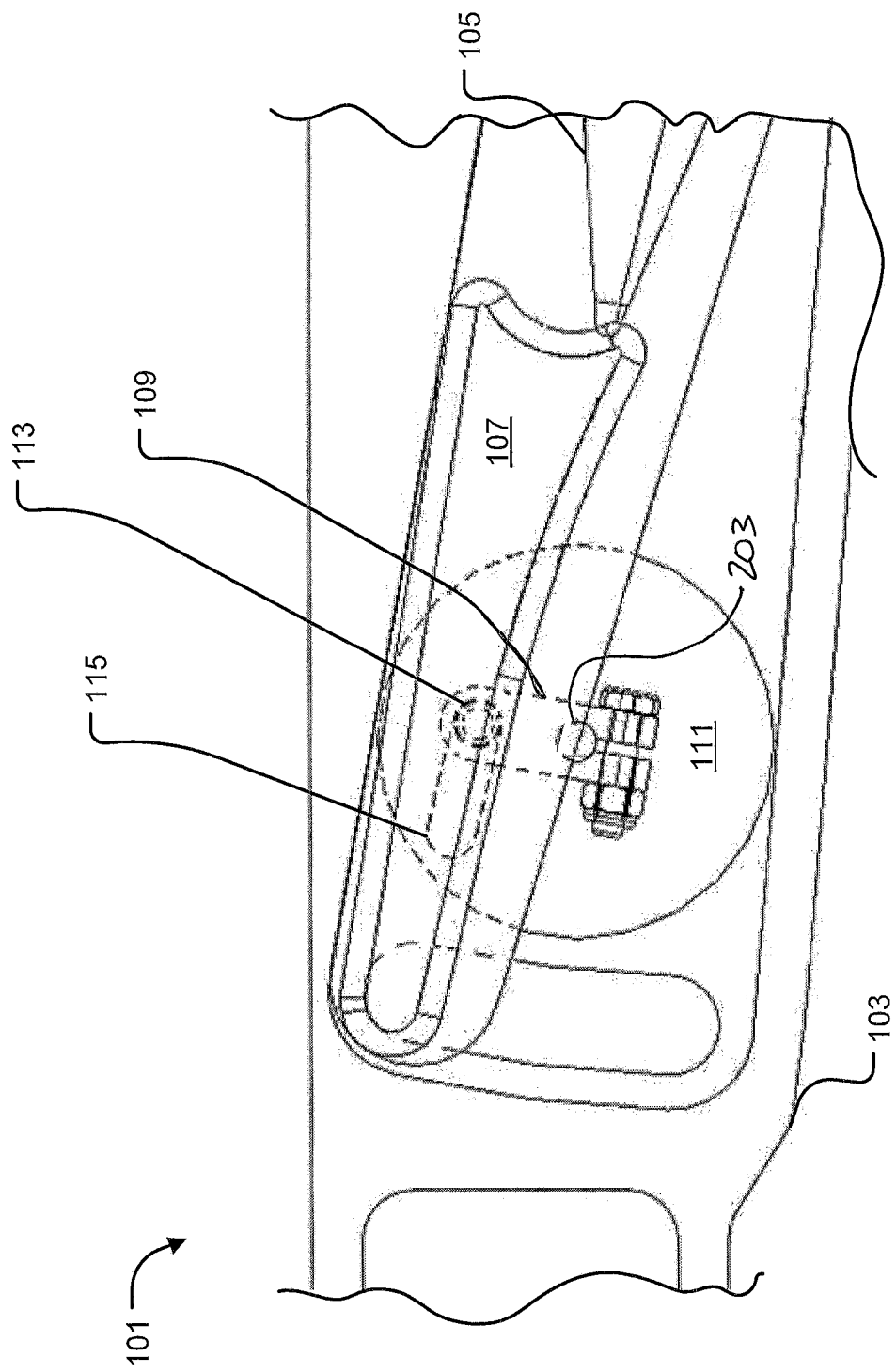
FIG. 3 is an enlarged view of the preferred embodiment of a mechanically locking diverter that is located in the diverted position according to the present application illustrating a slot to pin connection.

Referring now also to FIG. 3 in the drawings, mechanically locking diverter 101 is shown in the divert position.

Diverter flipper 107 includes a slot 115 configured to receive a pin 113. Although slot 115 is shown as straight, it will be appreciated that the shape of slot may be varied depending upon the desired movement and/or acceleration of diverter flipper 107. Pin 113 is coupled to diverter arm 109, which is rotatably driven by actuator 111. Actuator 111 is preferably recessed below diverter block 103. As actuator 111 rotates actuator arm 109 and pin 113, diverter flipper 107 is rotated between the non-diverted position and the diverted position. Because pin 113 is located in slot 115, the position of diverter flipper 107 is controlled by the rotational placement of pin 113 in relation to slot 115. Therefore, even when actuator 111 is without power, diverter flipper 107 will remain in the last controlled position. It is preferred that actuator arm 109 rotates approximately 90 degrees between the divert position and the non-divert position. Another embodiment of this design allows for the actuator arm to rotate approximately 180 degrees. This configuration creates a mechanical lock that holds diverter flipper 107 in either the divert position, the non-divert position, or both.

Figure 4:
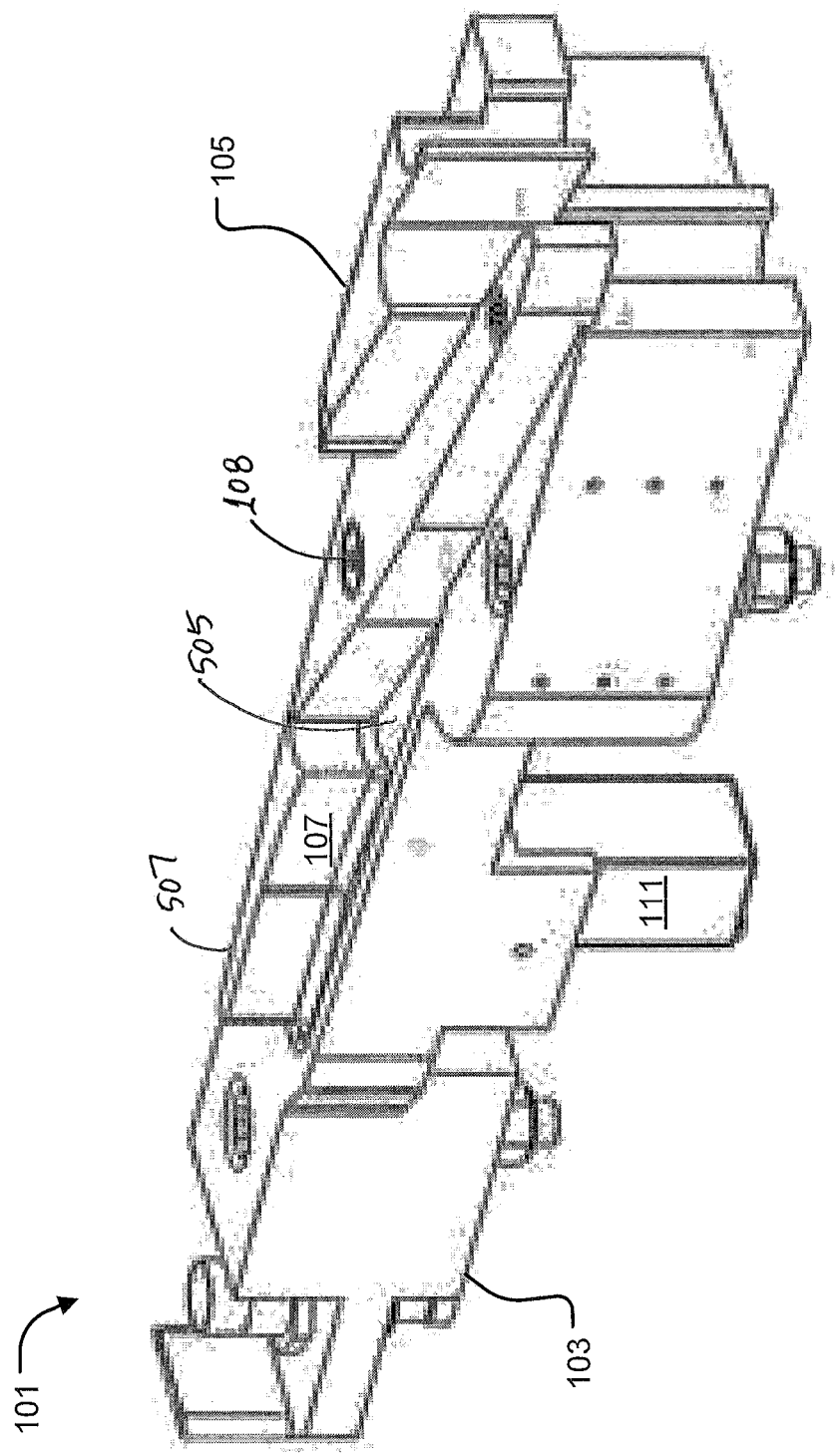
FIG. 4 is a perspective view of the preferred embodiment of a mechanically locking diverter according to the present application.

Referring now also to FIG. 4 in the drawings, mechanically locking diverter 101 is shown in the non-diverted position. As is shown, a base portion 505 (see FIG. 8) of diverter flipper 107 is recessed within diverter block 103, while a tab portion 507 of diverter flipper 107 extends above diverter block 103.

Figure 5:
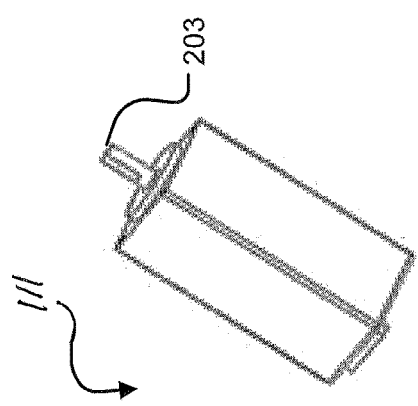
FIG. 5 is a perspective view of the preferred embodiment of an actuator according to the present application.

Referring now also to FIG. 5 in the drawings, actuator 111 is illustrated. Actuator 111 selectively rotates a shaft 203. Shaft 203 is configured for coupling to actuator arm 109. Actuator 111 is preferably configured and/or programmed to rotate shaft 203 back and forth between and angle of approximately 90 degrees or more.

Figure 6:
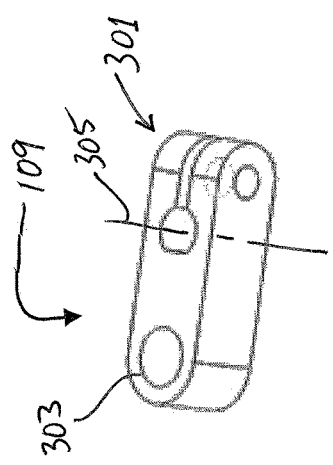
FIG. 6 is a perspective view of the preferred embodiment of an arm according to the present application.

Referring now also to FIG. 6 in the drawings, actuator arm 109 is illustrated. Actuator arm 109 is coupled to shaft 203, preferably via a clevis connection 301 forming a rotational axis 305, thereby selectively rotating pin 113. Actuator arm 109 includes a mount 303 for a pin 401 (see FIG. 7). Mount 303 is a specific distance away from rotational axis 305 of actuator arm 109, such that a 90-degree or more rotation about rotational axis 305 will correspond with a significant enough rotation in diverter flipper 107 to divert shoes 805 or let shoes 805 pass by.

Figure 7:
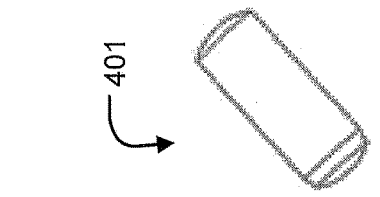
FIG. 7 is a perspective view of the preferred embodiment of a pin according to the present application.

Referring now also to FIG. 7 in the drawings, pin 401 is shown. Pin 401 is disposed between actuator arm 109 and diverter flipper 107. Pin 401 is of sufficient length to connect actuator arm 109 to diverter flipper 107 via a pin-and-slot connection located on diverter flipper 107.

Figure 8:
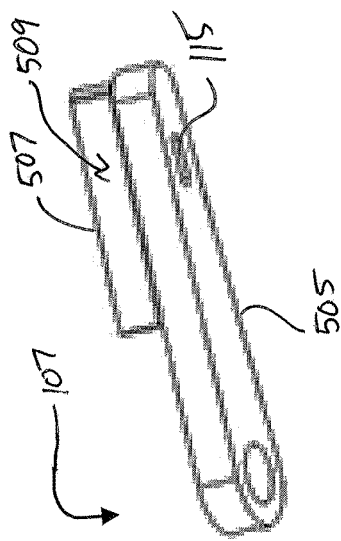
FIG. 8 is a perspective view of the preferred embodiment of a diverter flipper according to the present application.

Referring now also to FIG. 8 in the drawings, diverter flipper 107 is illustrated. As is shown, diverter flipper 107 moves between the divert position and the non-divert position based upon the location of pin 401 in slot 115. As is shown, base portion 505 is shaped and dimensioned to be recessed within diverter block 103, while tab portion 507 extends above diverter block 103. Diverter flipper 107 features a deflector 509, either a pin deflector, a roller deflector, or both. Deflector 509 is a face or component that comes into contact with the pin or roller on shoe 805, thereby causing shoe 805 to divert down a different path. Deflector 509 is sufficiently strong to withstand the force of the pin or the roller being diverted by deflector 509. Slot 115 of diverter flipper 107 is of sufficient width to allow pin 113 to slide within the bounds of slot 115. Slot 115 is long enough to allow at least 90 degrees or more of rotation about the axis of actuator 111. In addition, slot 115 is located far enough away from the rotational axis of diverter flipper 107 to allow for diverter flipper 107 to divert shoe 805 or let shoe 805 pass by.

Figure 9:
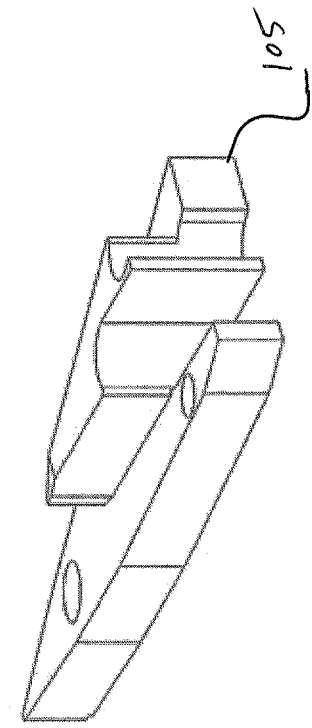
FIG. 9 is a perspective view of the preferred embodiment of a diverter pin guide according to the present application.

Referring now also to FIG. 9 in the drawings, diverter pin guide 105 is illustrated. Diverter pin guide is coupled to the top of diverter block 103. Diverter pin guide 105 works with diverter flipper 107 to direct shoes 805 down one of two different rail paths, so that shoes 805 may push packages into a selected sort locations.

Figure 10:
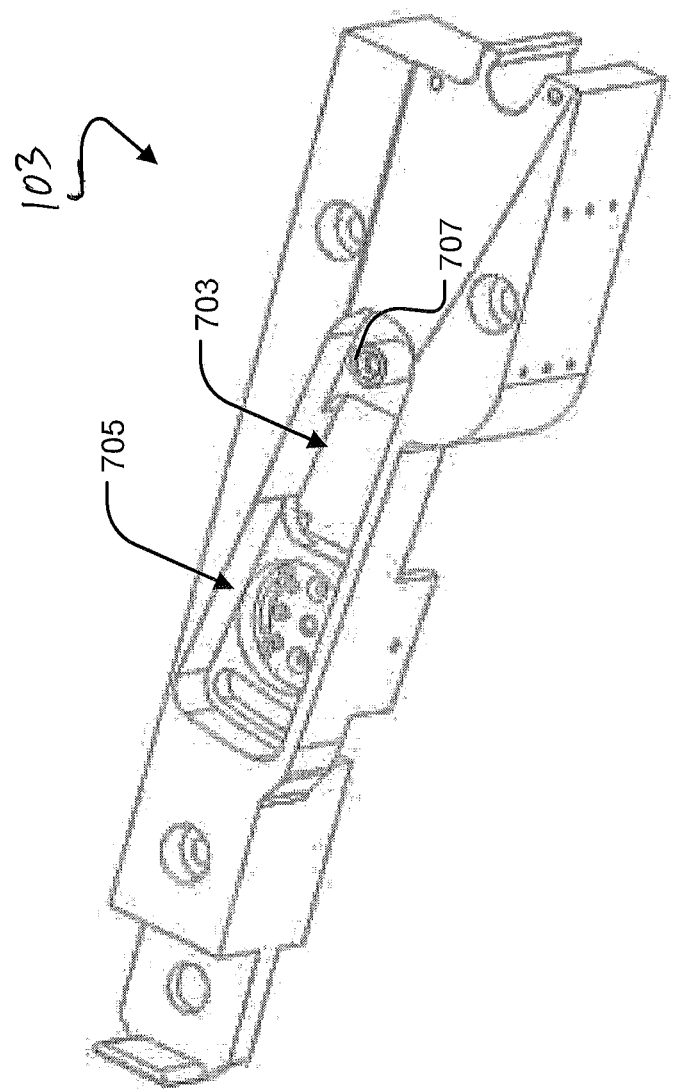
FIG. 10 is a perspective view of the preferred embodiment of a diverter block according to the present application.

Referring now also to FIG. 10 in the drawings, diverter block 103 is illustrated. Diverter block 103 includes of a diverter flipper channel 703, an actuator mount 705, and a shaft 707. Diverter flipper channel 703 is large enough to receive and allow diverter flipper 107 to rotate enough to divert shoe 805 let it shoe 805 pass by. Channel 703 is configured such that actuator arm 109 is close to the wall of the channel when diverter flipper 107 is diverting shoes 805 and when diverter flipper 107 is not diverting shoes 805. The configuration of actuator arm 109 being perpendicular (or just beyond perpendicular) to the wall of channel 703 creates a mechanical lock between the diverter flipper 107 and diverter block 103. Thus, actuator arm 109 operates between a first position corresponding to the non-divert position of diverter flipper 107, and a second position corresponding to the divert position of diverter flipper 107. Such lock prohibits external forces on diverter flipper 107 from moving diverter flipper 107. The lock can only be released by rotating actuator arm 109 out of a perpendicular angle from the wall, which allows diverter flipper 107 to be freely moved until actuator arm 109 is perpendicular to the other wall of channel 703. Actuator mount 705 is located far enough away from a central axis to acquire the desired rotation of diverter flipper 107. Shaft 707 is of sufficient size to fit into the rotational axis of diverter flipper 107. Diverter block 103 may include one or more ports, channels, and/or apertures for allowing dust and debris to fall out and/or be removed.

Figure 11:
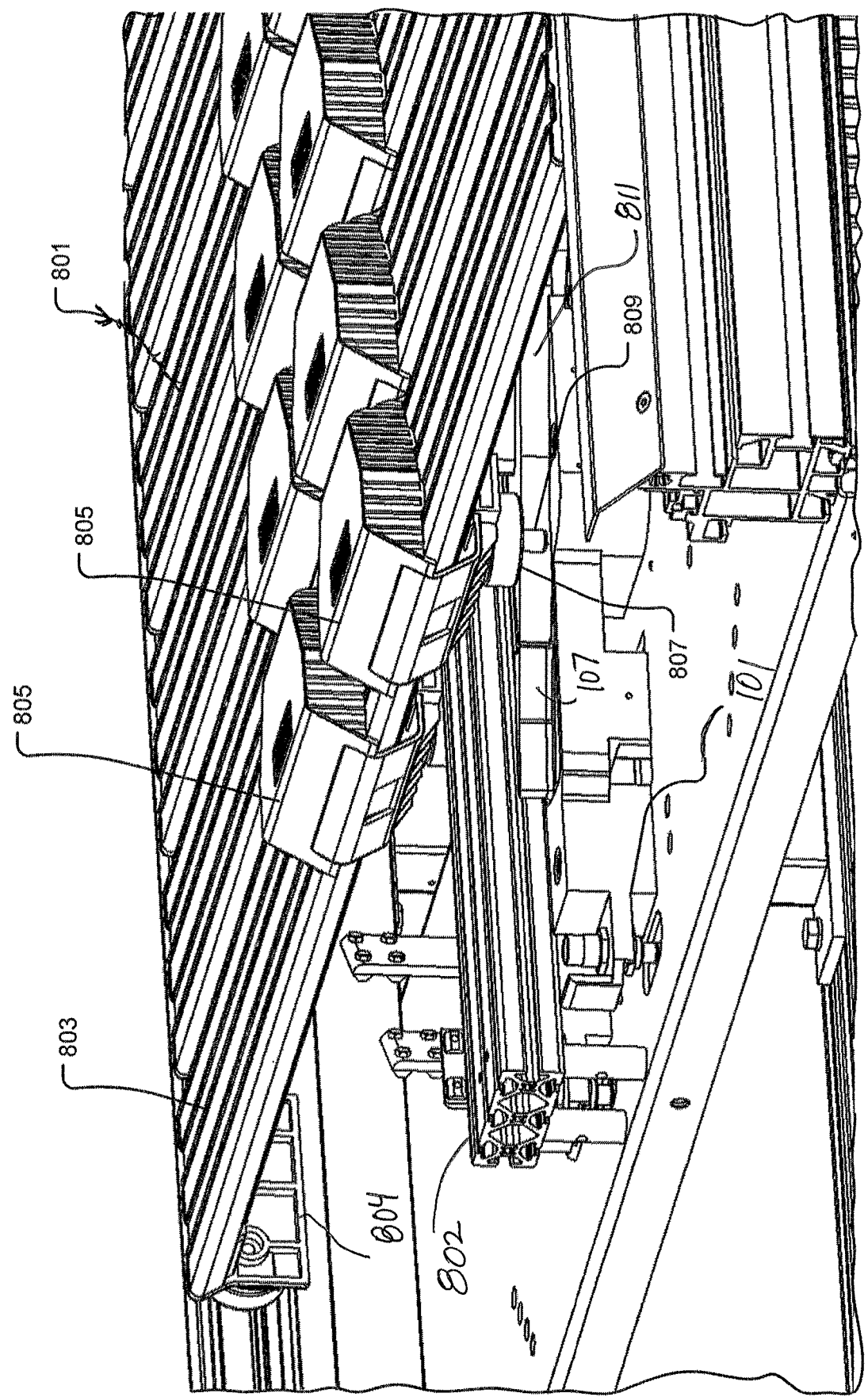
FIG. 11 is a partial cut out view of a Mechanically locking diverter diverting a shoe according to the present application.

Referring now also to FIG. 11 in the drawing, the preferred embodiment of a an automated sorting machine 801 according to the present application is illustrated. Sorting machine 801 includes at least one longitudinal rail 802, at least one transverse slat 803, at least one shoe 805 that is slidingly retained on slat 803, and at least one shortened diverter rail 811. Packages ride on slats 803 of sorting machine 801. Slats 803 terminate at a side wall 804, and may include a bumper member (not shown) to prevent damage to shoes 805 as shoes 805 contact side walls 804. Shoes 805 include a roller 807 and a pin 809, by which mechanically locking diverter 101 controls the path of shoe 805. In response to appropriate signals, diverter 101 is actuated into the divert position, whereupon shoe 805 is caused to move transversely along diverter rail 811, thereby selectively kicking the package off into a specific location or bin. Shoes 805 are returned to the inner position on slats 803 by appropriate re-divert rails (not shown).

It will be appreciated that the solenoid or linear actuator accelerates diverter 101 to high speeds upon actuation. Due to this high speed, typical diverters tend to bounce upon impact of a hard stop. Additionally it will be appreciated that shoes 805 are quite massive and move at very high speeds along rails 802 and slats 803. Another advantage of the unique locking feature of mechanically locking diverter 101 is that diverter flipper 107 is mechanically locked into either the divert position or the non-divert position by pin 113 and slot 115. This locking configuration helps to prevent diverter flipper 107 from bouncing when diverter flipper 107 is actuated or impacted by pin 809 of shoe 805 as shoe 805 passes by diverter flipper 107. Without this unique locking feature, diverter flipper 107 would be susceptible to undesirable movement and/or damage when impacted by pin 809.

Figure 12:
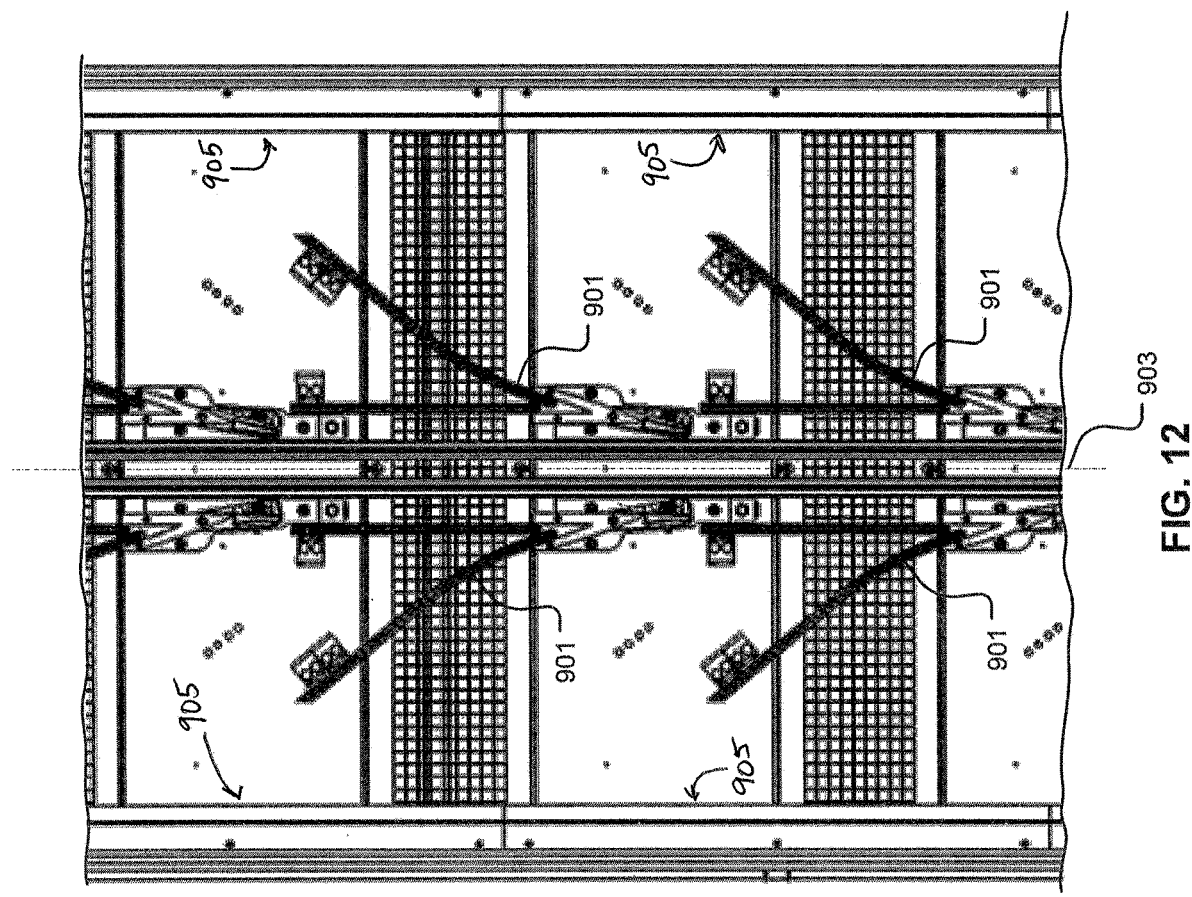
FIG. 12 is a partial plan view of the preferred embodiment of a conveyor sortation system according to the present application.
Figure 13:
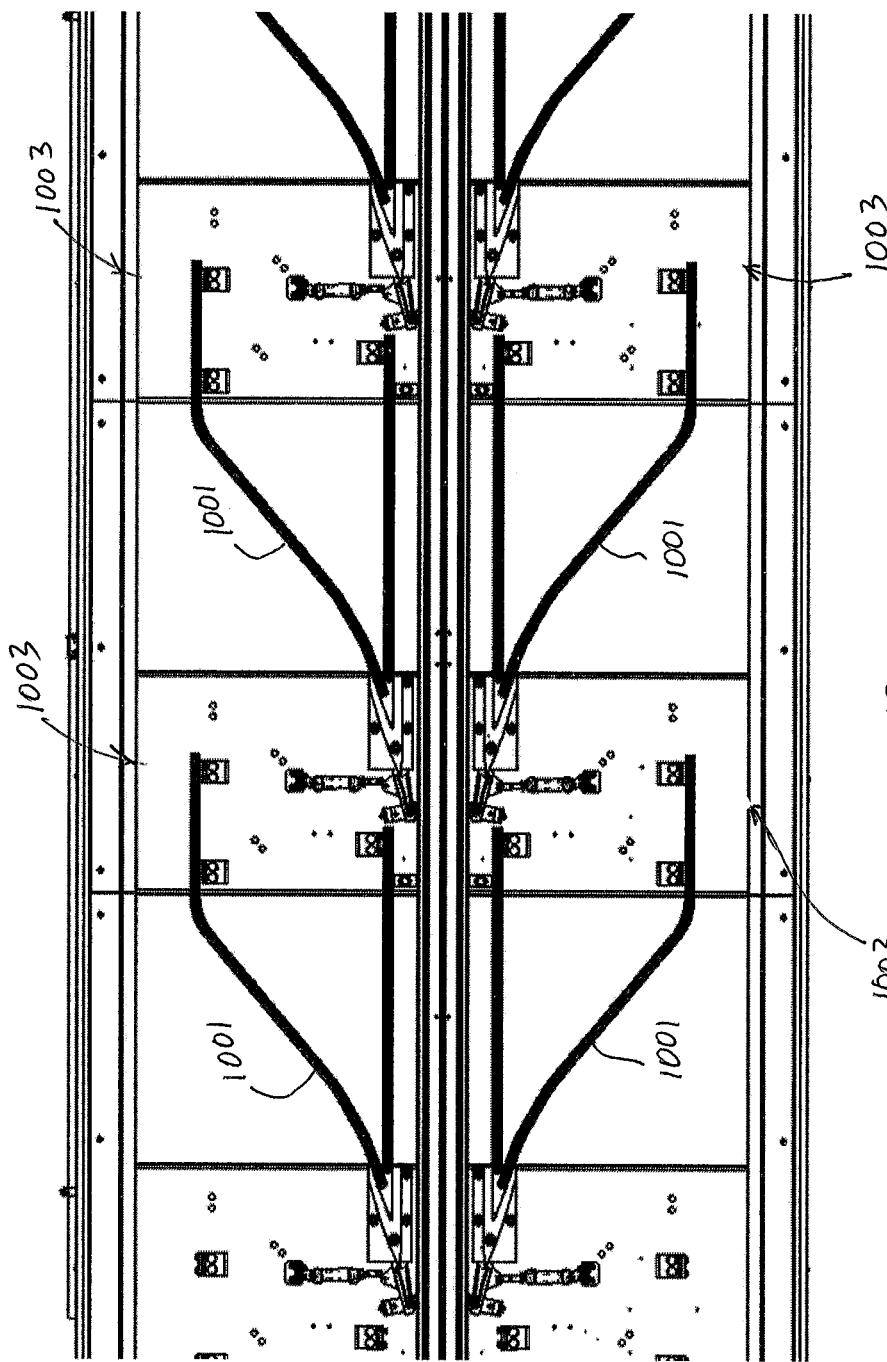
FIG. 13 is a partial plan view of a conventional conveyor sortation system.

Referring now also to FIG. 12 in the drawings, a conveyor sortation system according to the present application is illustrated. For reference, FIG. 13 shows a conventional standard diverter rail design. As is shown in FIG. 12, the diverter rails 901 are shortened, compared to the diverter rails 1001 of FIG. 13. In addition, divert rails 901 do not turn back in the longitudinal direction. By utilizing shortened diverter rails 901, the distance that the shoe is guided is reduced. As is shown in FIG. 13, the terminal divert position 1003 is the maximum final position of a diverted shoe, such as shoe 805, with respect to the linear axis of movement of the shoe along a corresponding slat, such as slat 803. In the system of FIG. 13, the shoes slam into the side walls of the slats. Another advantage of shortened diverter rails 901 is that the corresponding shoes, i.e., shoes 805, remain at least 1.5 inches away from the terminal divert position 905, i.e. side walls 804 of slats 803. As shoes 805 travel past the ends of divert rails 901, the friction of shoes 805 along slats 803 causes shoes 805 to stop or slow down prior to contacting side walls 804 of slats 803. This prevents shoes 805 from being damaged by repeated contacting of side walls 804. In addition, it is preferred that the angle between a straight portion of the diverter rail 901 and a centerline 903 of the main rail be at least 21 degrees or greater.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered, combined, and/or modified, and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms but is amenable to various changes and modifications without departing from the spirit thereof.

I claim:

1. A diverter for an automated sorting machine, the diverter comprising:
    a diverter block;
    an actuator coupled to the diverter block;
    an actuator arm coupled to the actuator, the actuator arm being operable between a first position and a second position;
    a diverter flipper pivotally coupled to the diverter block, the diverter flipper having a slot and being operable between a non-divert position corresponding to the first position of the actuator arm and a divert position corresponding to the second position of the actuator arm; and
    a pin coupled to the actuator arm and being disposed within the slot of the diverter flipper, such that rotation of the actuator arm between the first position and the second position pivots the diverter flipper between the non-divert position and the divert position;
    wherein the first position and the second position of the actuator arm are separated by approximately 90 degrees, thereby creating a mechanical lock that holds the diverter flipper in either the non-diverted position or the diverted position.

2. The diverter according to claim 1, wherein the actuator is recessed into the diverter block.

3. The diverter according to claim 1, wherein the pin only moves in response to rotation of the actuator.

4. The diverter according to claim 1, further comprising:
    a channel located in the diverter block;
    wherein a portion of the diverter flipper is recessed within the channel.

5. The diverter according to claim 1, wherein the actuator arm rotates through an angle that is greater than 90 degrees.

6. The diverter according to claim 1, wherein the actuator arm rotates through an angle that is approximately 180 degrees.

7. The diverter according to claim 1, wherein the slot is straight.

8. An automated sorting machine, comprising:
    at least one longitudinal rail;
    a plurality of transverse slats configured to travel longitudinally along the rail;
    at least one shoe slidingly retained on at least one of the slats;
    at least one diverter rail; and
    at least one diverter disposed along the longitudinal rail, the diverter comprising:
    a diverter block;
    an actuator coupled to the diverter block;
    an actuator arm coupled to the actuator, the actuator arm being operable between a first position and a second position;
    a diverter flipper pivotally coupled to the diverter block, the diverter flipper having a slot and being operable between a non-divert position corresponding to the first position of the actuator arm and a divert position corresponding to the second position of the actuator arm; and
    a pin coupled to the actuator arm and being disposed within the slot of the diverter flipper, such that rotation of the actuator arm between the first position and the second position pivots the diverter flipper between the non-divert position and the divert position;
    wherein the first position and the second position of the actuator arm are separated by at least 90 degrees, thereby creating a mechanical lock that holds the diverter flipper in either the non-diverted position or the diverted position.

9. The automated sorting machine according to claim 8, wherein the pin only translates in response to rotation of the actuator.

10. The automated sorting machine according to claim 8 wherein the shoe does not translate along the diverter rail when the diverter flipper is in the non-divert position, but the shoe does translate along the diverter rail when the diverter flipper is in the divert position.

11. The automated sorting machine according to claim 8, wherein the actuator arm is rotated greater than 90 degrees.

12. The automated sorting machine according to claim 8, further comprising:
    a diverter pin guide;
    wherein the diverter block abuts the diverter pin guide and the diverter flipper.

13. The automated sorting machine according to claim 8, further comprising:
    a channel located in the diverter block;

wherein a portion of the diverter flipper is recessed within the channel.

14. A divert rail system for an automated sortation machine having a generally longitudinal main rail, a plurality of generally transverse slats, a plurality of shoes, each shoe being configured to travel along a corresponding slat, each slat terminating in a side wall, the divert rail system comprising:
- a plurality of divert rails branching off from the main rail, each divert rail forming an angle of about 21 degrees or more with the main rail and terminating at and end, such that the divert rail does not curve back toward the longitudinal direction;
- wherein the length of each divert rail is selected, such that the each shoe travels transversely past the end of the divert rail and stops at a transverse stopping position that is at least 1.5 inches away from the side wall of the slat;
- at least one diverter disposed along the main rail, the diverter comprising:
  - a diverter block;
  - an actuator coupled to the diverter block;
  - an actuator arm coupled to the actuator, the actuator being operable between a first position and a second position;
  - a diverter flipper pivotally coupled to the diverter block, the diverter flipper having a slot and being operable between a non-divert position corresponding to the first position of the actuator arm and a divert position corresponding to the second position of the actuator arm; and
  - a pin coupled to the actuator arm and being disposed within the slot of the diverter flipper, such that rotation of the actuator arm between the first position and the second position pivots the diverter flipper between the non-divert position and the divert position;
- wherein the first position and the second position of the actuator arm are separated by at least 90 degrees, thereby creating a mechanical lock that holds the diverter flipper in either the non-diverted position or the diverted position.

15. The divert rail system of claim 14, wherein the end of each divert rail is located a selected distance away from the side wall of the slat, so as to form a gap between the end of the divert rail and the side wall that is sized to receive a roller and a pin carried by the shoe.

* * * * *